United States Patent

Hans et al.

[15] 3,648,518

[45] Mar. 14, 1972

[54] APPARATUS FOR MEASURING THE FLOW VOLUME OF GASES AND LIQUIDS

[72] Inventors: Rainer Hans, Kolner Str. 27, Bechen; Michael Lancier, Hoverweg 4, Bensberg-Durscheid; Hermann Becher, Veilchenweg 57, Porz-Heumar, all of Germany

[22] Filed: Feb. 5, 1970

[21] Appl. No.: 8,882

[30] Foreign Application Priority Data

Feb. 7, 1969 Germany......................P 19 05 999.5

[52] U.S. Cl........................................................73/204
[51] Int. Cl.........................................................G01p 5/10
[58] Field of Search................................................73/204

[56] References Cited

UNITED STATES PATENTS

| 2,412,471 | 12/1946 | Olson | 73/204 |
| 2,953,022 | 9/1960 | Laub | 73/204 |
| 3,085,431 | 4/1963 | Yerman et al. | 73/204 |
| 3,246,515 | 4/1966 | Martino | 73/204 |
| 3,425,277 | 2/1969 | Adams | 73/204 |

FOREIGN PATENTS OR APPLICATIONS 1,109,118   4/1968   Great Britain..........................73/204

OTHER PUBLICATIONS

Laub, " Read Mass Flow Directly With Thermal Flowmeters" IN Control Engineering, April 1966, pp. 69– 72.

*Primary Examiner*—Charles A. Ruehl
*Assistant Examiner*—Herbert Goldstein
*Attorney*—Curt M. Avery, Arthur E. Wilfond, Herbert L. Lerner and Daniel J. Tick

[57] ABSTRACT

An apparatus for measuring the flow volume of gases and liquids by measuring the difference, between the voltage drop of an ohmic resistance, heated to measuring temperature and encompassed by the medium to be measured, and a second comparison resistance encompassed by the medium and constituting the reference value by a bridge network. Because of the medium-produced cooling of the measuring body formed by the resistance coil, the unbalance of the bridge network controls the replenishment of the heating power to be supplied by the measuring body, for producing the balance of the bridge network. The replenished heating power represents, in accordance with the resistance change of the measuring coil, the rate for the flow through volume.

5 Claims, 4 Drawing Figures

APPARATUS FOR MEASURING THE FLOW VOLUME OF GASES AND LIQUIDS

It has been suggested, to measure the flow volume of gases and liquids, by inserting a thermistor into the flow cross section and heating the thermistor to measuring temperature in the vicinity of the permissible maximum value, since it will then react less to fluctuations of the ambient temperature thereby increasing the sensitivity.

The unbalance of the bridge network is controlled by the difference in the rate of the medium which flows past the thermistor and by the changes in resistance, caused thereby. The diagonal voltage which occurs at the bridge constitutes a measure for the flow of the medium.

The known process has the disadvantage that this measuring method requires the formation of a reference position to compensate for the pressure and for the temperature of the gas. This compensation of pressure and of temperature cannot be effected without measuring errors, since the pressure occurs twice logarithmically while the temperature is linear. Moreover, the thermistors have a long duration effect which makes an exact measurement over a longer period impossible because of aging and deposit.

The usage opportunities of the known flow measuring method are limited insofar that arbitrarily high flow rates cannot be measured since the thermistor heating power can be replenished only to a limited extent.

Our invention has among its objects to devise a device which would prevent the above-described disadvantages and which above all will afford a much shorter response period. Moreover, it is also our object to avoid the shortcomings, which are a result of the bypass required in the known thermistor methods, and most particularly, to avoid the pressure drop associated with this bypass.

Issuing from the known measuring process, the present invention is so characterized that the unbalance of the bridge network controls the replenishing of the heating power, supplied to the measuring body for obtaining the balance, as a result of the medium-produced cooling of the measuring body, formed by the resistance coil. The replenished filament power thus constitutes a measure for the flow volume, corresponding to the resistance change in the measuring coil.

The above-described method offers the advantage that accurate measuring values can be obtained even over extremely long periods, since the coil which defines the measuring body is not subjected to any changes caused by aging. It is further possible to eliminate errors in measuring which are traceable to pressure and temperature changes of the flowing medium.

The present invention also makes it possible to measure flow rates within a range between zero and almost the sonic barrier, which cannot easily be reliably accomplished with the aid of the heretofore known methods.

The invention also affords great advantages when used in the field of vacuum technology. Since the surfaces of the known thermistors are too small, the danger of local turbulences which may falsify the measuring results occur. The method of the present invention is furthermore particularly valuable since it can also be used for measuring the flow rate of particularly aggressive mediums, such as hydrofluoric acid. To this end, it is necessary for the measuring coils to be completely sealed against the medium and to be provided with a surface coating, for example a nickel plating which is resistant to the medium being measured. The measuring body, which is intended for the method, is particularly suitable for sealing purposes, as well as for surface coating.

As a further feature of the invention, the voltage balance at the measuring bridge should be influenced in order to maintain the supplied heating or filament power constant through resistance changes occurring in a reference coil winding, connected with the measuring body in forward direction, due to temperature fluctuations of the medium on the input side. This mode of operation makes it possible to balance the temperature fluctuations of the flowing medium instantly, since, the resistance change occurring in the reference coil winding, that is connected in series with the measuring body, influences directly the voltage balance of the measuring bridge and thus acts upon the replenished heating power by an appropriate compensation of the resistance change in the measuring coil.

A compensation of the outer pressure fluctuations and of the temperature fluctuations which occur during measuring can be obtained in accordance with another feature, by arranging an outer heating device in the region of the measuring body which is either being passed through or circulated. This outer heating device peripherally encloses the flow-through cross section. The temperature of the heater is maintained at a constant value. The constant temperature value is so adjusted that it corresponds to the surface temperature of the measuring body. This results in the fact that a measuring error does not occur in a nonflowing condition, through free convection.

The measuring process of the invention eminates from the fact that as soon as the medium, which is located in the system begins to flow, more or less heat will be removed from the measuring body according to the flow rate. As a result of the occurring bridge unbalance, an accordingly high heating or filament power is replenished or reestablished which constitutes the measure for the flow volume. Hence this relates to a true mass weight rate of flow, whereby a calibration is effected for each medium corresponding to the specific weight. The response time to 100 percent of the measuring signal is considerably shorter according to present day experiences, compared to the known methods. This can be credited primarily, to the compact construction of the measuring body.

The device is preferably comprised of a known measuring body, arranged in the flow-through cross section and circulated by the medium to be measured. The measuring body may be heated to measuring temperature and form an ohmic resistance. The device also comprises a comparison resistance defining a reference value and is also circulated by the medium being measured. The measuring body and the comparison resistance are both connected to an adjacent branch of a bridge circuit which may be unbalanced by the variable resistance because of the flowing medium. In order to replenish the filament power required for maintaining the measuring temperature during zero passage, the heating voltage for the measuring body is applied diagonally to the complete bridge. A particular advantage of the invention is in the construction of the measuring body which comprises at least one heating and one measuring coil which respectively are the intimate mechanical contact with each other. As a result, a very short time is required for the heat-up process.

Preferably, the measuring body is designed as a tubular body which is positioned axially in the direction of the flow. The measuring device is defined by a helically wound cylindrical heating coil surrounded by an inner and outer measuring coil which are in close mechanical contact with the heating coil and are also helically wound. This construction affords a compact design of the measuring coil and also produces a lower flow resistance.

According to a further feature, it is also advantageous to place the measuring device centrally in a tubular section, which widens in an inner diameter and is passed by the medium to be measured. The reference coil winding should be arranged in the flow direction, ahead of the measuring body also located in the current of the medium. In a further embodiment of the invention, the reference coil winding can be embedded in the wall of the tubular portion which is connected ahead of the diameter expansion and passed by the medium, to be measured.

A temperature drop occurs in the tubular section, widened in diameter for the purpose of receiving the measuring body, i.e., in the radial plane of the flow-through cross section, more specifically in the peripheral region. The temperature drop is compensated in accordance with the invention, by a heating coil placed upon the wall of the measuring tube portion, in the region of the measuring body. The heating power of this heating coil should be so adjusted that its temperature will be equal to the temperature of the measuring coil.

The device which we use for putting the method of the invention into effect, comprises an expanded tubular section for accommodating the centrally positioned measuring body, a compensation heating coil embedded in the wall of this tubular section, conical expansions or taperings connected in axial direction at both ends of this tubular section, the expansions or taperings ending into short nozzles provided with pipe connections, and the pipe connection nozzle, which is connected in series with the measuring body in flow direction, is provided with the reference coil winding.

The drawing shows embodiment examples of the invention which will illustrate the same in greater detail and wherein.

Figure 1:
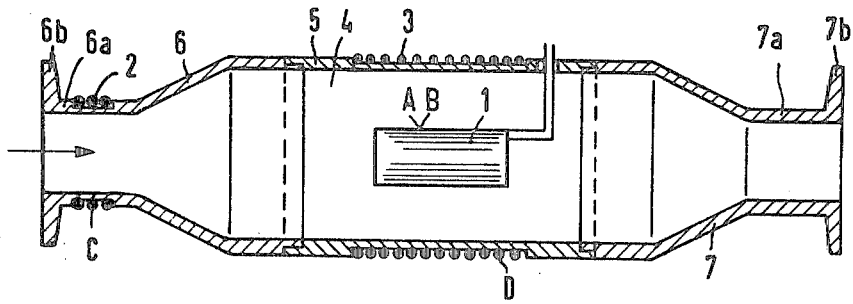
FIG. 1 shows in longitudinal section a measuring device for performing the method.

The measuring body 1, the reference coil winding 2 and the outside heater 3 are on or in, the measuring device 4 that is passed by the medium to be measured. The measuring device itself comprises a tubular section 5 expanded in its diameter, wherein the measuring body 1 is centrally placed and further comprises conical expansions 6 or taperings 7 connected at both ends in axial directions and ending in pipe nozzles 6a, 7a, with appropriate flanges 6b and 7b respectively. The embodiment in FIG. 1 shows the conical tubular sections 6 and 7 are connected as a sleeve at the expanded tubular section 5 and are sealed in the juncture.

At its outer diameter, the tubular section 5 is provided with the compensation heating coil winding 3, which is embedded into a recess in this section. The pipe nozzle 6a which is connected in series and in flow direction, with the measuring coil 1, is provided with the reference coil winding which is embedded into the wall of this pipe section.

Figure 2:
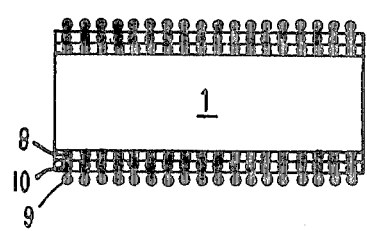
FIG. 2 shows a schematic longitudinal section through the measuring body.
Figure 3:
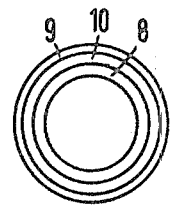
FIG. 3 shows a cross section of FIG. 2.

As seen in FIGS. 2 and 3, the measuring body comprises three helical coil windings which are in close mechanical contact with one another. The inner winding 8 and the outer winding 9 are measuring coils, while the intermediate winding 10 is the heating coil.

Figure 4:
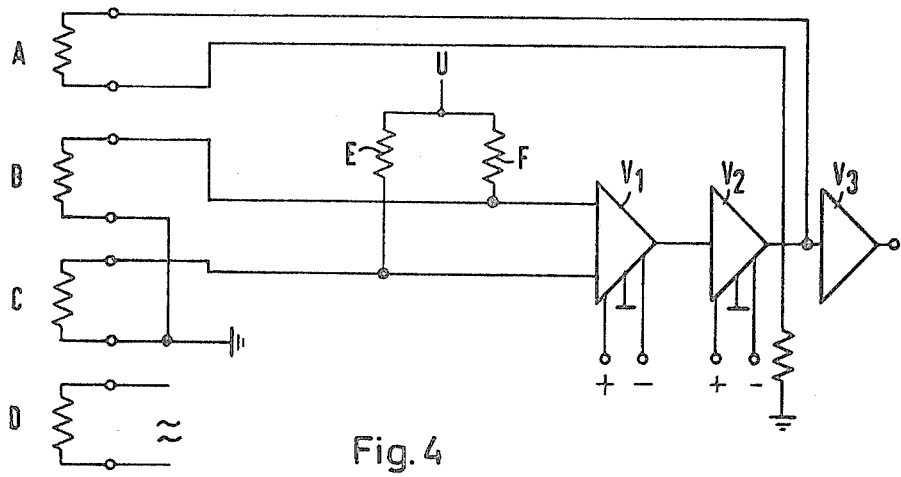
FIG. 4 is a schematic diagram of the measuring circuit.

FIG. 4 schematically illustrates the circuit of the measuring device. The complete bridge circuit is built up of two fixed resistances E and F and of both coil windings, of which B is the measuring coil and C the reference coil. The output of this complete bridge circuit simultaneously defines the input of the amplifier $V_1$, which preamplifies the bridge unbalance. The amplifier $V_2$ connected to the outlet side controls the heating power of the heating coil A, by means of the signal delivered by amplifier $V_1$ while the potential difference which is produced thereby at the output of the amplifier $V_2$, is used via an output amplifier $V_3$, for obtaining the measuring signal.

I claim:

1. Apparatus for measuring the flow volume of liquid and gases which comprises a tubular measuring body axially arranged in a conduit traversed by the fluid to be measured, said measuring body comprising a heating wire helically wound into a cylindrical shape and forming a center coil, and two further wires also helically wound into cylindrical shape and forming measuring coils placed in close thermal contact with said central heating coil by being arranged coaxially with it, one measuring coil being placed within said heating coil and the other without said heating coil, mechanical contact between the coils being established in both cases, a reference coil situated upstream of the measuring body, an electrical bridge circuit having as one arm the said reference coil, both measuring coils as another arm and one fixed resistance as each of the remaining arms, a constant source of electric energy and first, second and third amplifiers, the first amplifier connected to the bridge output and the second amplifier, the second amplifier output connected to the heating coil thereby increasing the voltage to the heating coils until the measuring coils, being heated by the heating coil, attain a temperature sufficient to rebalance the bridge, the voltage from the constant energy source connected to the two fixed resistors, the voltage supplied to the heating coil amplified by the third amplifier, being proportional to the amount of fluid traversing the conduit at the given moment.

2. The apparatus of claim 1, wherein the measuring body is arranged centrically in a pipe section expanded in its inner diameter and passed by the medium to be measured and that the reference coil winding is arranged in flow direction ahead of the measuring body and also positioned in the region of the wall of the supply tube.

3. The apparatus of claim 2, wherein the reference coil winding is placed outside on the wall of the pipe section which is connected in series with the expanded diameter.

4. The apparatus of claim 2, wherein the reference coil winding within the passed tubular section ahead of the expanded diameter is wetted by the medium to be measured.

5. The apparatus of claim 1, wherein a compensation heating coil winding is embedded in the wall of the measuring section of expanded diameter in order to compensate for the outer pressure and temperature fluctuations which occur during the measuring process.

* * * * *